US012443911B2

(12) United States Patent
Fu et al.

(10) Patent No.: US 12,443,911 B2
(45) Date of Patent: Oct. 14, 2025

(54) APPARATUS AND METHODS FOR DETERMINING DELIVERY ROUTES AND TIMES BASED ON GENERATED MACHINE LEARNING MODELS

(71) Applicant: Walmart Apollo, LLC, Bentonville, AR (US)

(72) Inventors: Mingang Fu, Palo Alto, CA (US); Amritayan Nayak, Fremont, CA (US); Li Ji, Fremont, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 1052 days.

(21) Appl. No.: 16/670,433

(22) Filed: Oct. 31, 2019

(65) Prior Publication Data

US 2021/0133677 A1 May 6, 2021

(51) Int. Cl.
*G06Q 10/0835* (2023.01)
*G06F 16/29* (2019.01)
*G06N 20/00* (2019.01)

(52) U.S. Cl.
CPC ....... *G06Q 10/08355* (2013.01); *G06F 16/29* (2019.01); *G06N 20/00* (2019.01)

(58) Field of Classification Search
USPC ....................................................... 705/338
See application file for complete search history.

(56) References Cited

U.S. PATENT DOCUMENTS

| 7,191,142 B1 | 3/2007 | Sandell et al. |
| 7,225,983 B2 | 6/2007 | Park et al. |
| 7,243,074 B1 | 7/2007 | Pennisi, Jr. |

(Continued)

FOREIGN PATENT DOCUMENTS

| CN | 110392899 A | * | 10/2019 | ............. G06F 17/10 |
| WO | WO-2018205776 A1 | * | 11/2018 | ............. G06F 16/00 |

OTHER PUBLICATIONS

Servos, Nikolaos, et al. "Travel time prediction in a multimodal freight transport relation using machine learning algorithms." Logistics 4.1 (2019): 1. (Year: 2019).*

(Continued)

*Primary Examiner* — Kristin E Gavin
(74) *Attorney, Agent, or Firm* — Morgan, Lewis & Bockius LLP; Manita Rawat

(57) ABSTRACT

This application relates to apparatus and methods for generating and implementing a machine learning model in electronic delivery systems to determine delivery routes and times. In some examples, a computing device generates a machine learning model comprising a plurality of indexed binary trees. Each indexed binary tree determines either a first value, or a second value, based on comparing an input to a condition value. The machine learning model can generate prediction values based on the determined values of all indexed binary trees. The machine learning model is trained with historical data. Once trained, the machine learning model's performance is evaluated. Based on the evaluation, the machine learning model may be further refined. Once the machine learning model's performance satisfies requirements, the computing device employs the machine learning model to determine vehicle delivery routes and estimated delivery times.

20 Claims, 12 Drawing Sheets

(56) References Cited

U.S. PATENT DOCUMENTS

| | | | |
|---|---|---|---|
| 7,313,530 B2 | 12/2007 | Smith et al. | |
| 7,457,761 B2 | 11/2008 | Smith et al. | |
| 8,599,683 B2* | 12/2013 | Nakanishi | H04L 45/02 709/239 |
| 8,857,709 B2 | 10/2014 | Hancock et al. | |
| 10,437,435 B2 | 10/2019 | Ladden et al. | |
| 10,452,236 B2 | 10/2019 | Ladden et al. | |
| 10,460,332 B1* | 10/2019 | Kujat | G06Q 30/0202 |
| 10,535,034 B2 | 1/2020 | Zhang et al. | |
| 2004/0220957 A1* | 11/2004 | McDonough | G06F 16/29 707/999.102 |
| 2005/0137933 A1* | 6/2005 | Holsen | G06Q 10/08 705/338 |
| 2005/0137993 A1* | 6/2005 | Poon | G06N 3/063 706/26 |
| 2007/0016467 A1* | 1/2007 | John | G06Q 30/0202 705/7.31 |
| 2014/0324871 A1* | 10/2014 | Ray | G06F 16/35 707/740 |
| 2014/0330741 A1* | 11/2014 | Bialynicka-Birula | G06Q 10/0838 705/341 |
| 2015/0317327 A1* | 11/2015 | He | G06F 16/81 707/693 |
| 2016/0156595 A1* | 6/2016 | Wu | H04L 9/008 713/168 |
| 2016/0171434 A1 | 6/2016 | Ladden et al. | |
| 2016/0171436 A1 | 6/2016 | Ladden et al. | |
| 2016/0171437 A1 | 6/2016 | Ladden et al. | |
| 2016/0171438 A1 | 6/2016 | Ladden et al. | |
| 2017/0372232 A1* | 12/2017 | Maughan | G06N 20/00 |
| 2018/0357736 A1* | 12/2018 | Sun | G06N 3/08 |
| 2019/0303197 A1* | 10/2019 | Li | G06F 9/4887 |
| 2019/0361905 A1* | 11/2019 | Rogynskyy | G06F 16/212 |
| 2020/0012917 A1* | 1/2020 | Pham | G06F 18/22 |
| 2020/0160225 A1* | 5/2020 | Sun | G06Q 10/06 |
| 2020/0342398 A1* | 10/2020 | Aggarwal | G06Q 10/0838 |
| 2020/0342517 A1* | 10/2020 | Rajkhowa | G06Q 30/0635 |

OTHER PUBLICATIONS

"XGBoost Tutorials", XGBoost. https://xgboost.readthedocs.io/en/latest/tutorials/model.html.

"Decision Tree", GeeksforGeeks, a Computer Science Portal for Geeks. https://www.geeksforgeeks.org/decision-tree/.

"Decision Trees", Carnegie Mellon University. https://www.cs.cmu.edu/~bhiksha/courses/10-601/decisiontrees/.

Chen, "Introduction to Boosted Trees", University of Washington, 2014. https://homes.cs.washington.edu/~tqchen/pdf/BoostedTree.pdf.

Guazelli, "What is PMML?", IMB, 2010. https://www.ibm.com/developerworks/library/ba-ind-PMML1/index.html.

"JVM Package", XGBoost. https://xgboost.readthedocs.io/en/latest/jvm/java_intro.html.

"CLI". GitHub. https://github.com/BayesWitnesses/m2cgen#cli.

"How do you take a machine learning model to production", Quora. https://www.quora.com/How-do-you-take-a-machine-learning-model-to-production.

* cited by examiner

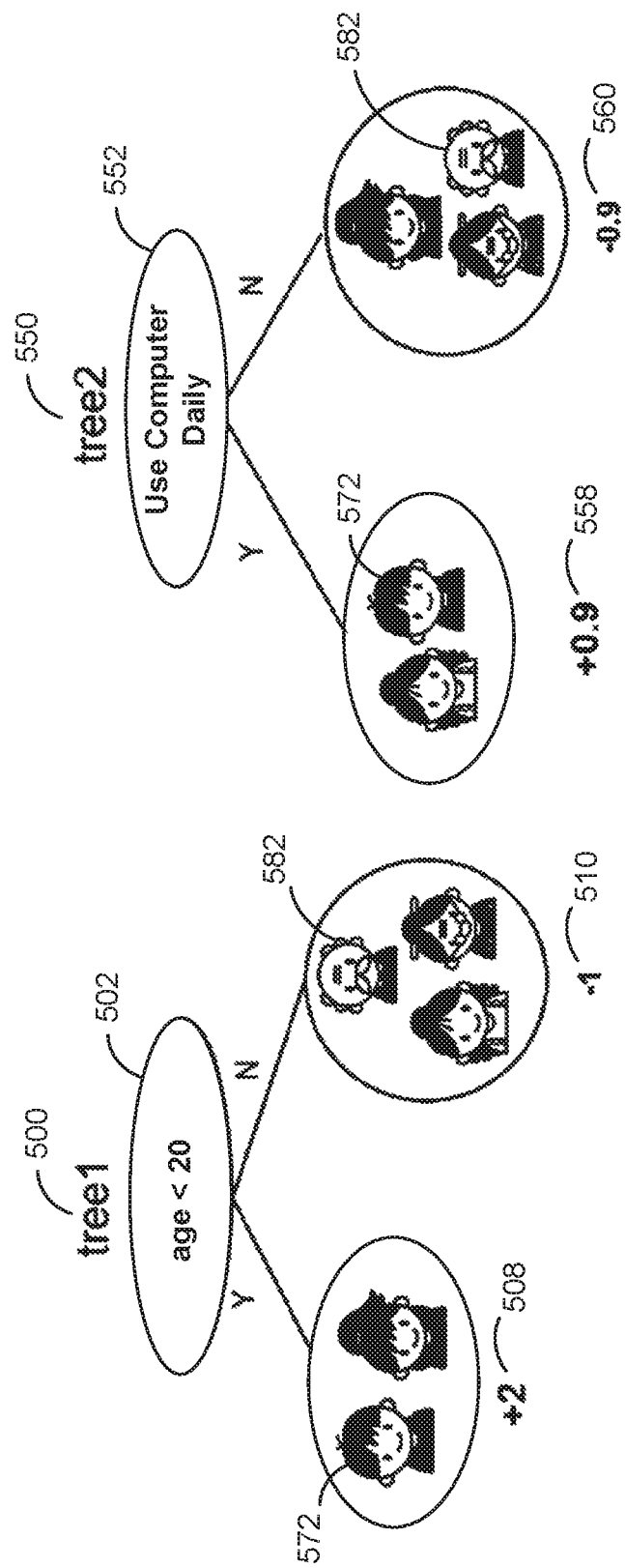

APPARATUS AND METHODS FOR DETERMINING DELIVERY ROUTES AND TIMES BASED ON GENERATED MACHINE LEARNING MODELS

TECHNICAL FIELD

The disclosure relates generally to delivery services and, more specifically, to electronic delivery management systems.

BACKGROUND

At least some retailers deliver purchased goods, such as groceries, to a customer. When an order is placed, the retailers must gather the purchased goods and place them on a vehicle, such as a truck, for delivery. The delivery vehicle may collect the purchased goods for an order from a warehouse or store, and deliver the purchased goods to a customer at a specified delivery address, such as to the customer's home. Some delivery management systems allow a customer to select a delivery window specifying a range of time when the goods may be delivered. Similarly, some delivery management systems allow delivery drivers to schedule times when they are available for delivery.

These delivery management systems, however, have drawbacks. For example, drivers may be scheduled to deliver orders that, due to poor scheduling, cannot be delivered on time, e.g., within the requested delivery window. In some examples, purchased goods may perish before they are delivered. For example, ice cream may melt, or meat may spoil, before they are delivered. In yet other examples, purchased goods may go undelivered because no one was at the delivery location to accept the delivery. Therefore, for these and other reasons, current delivery management systems have drawbacks.

SUMMARY

The embodiments described herein may optimize delivery management systems and services by, for example, improving and/or ensuring on-time deliveries, reducing the number of undelivered orders, or more efficiently scheduling delivery vehicle drivers. As a result, a retailer employing one or more of these embodiments may benefit by expending less effort and time in scheduling activities. The retailer may also enjoy a reduction in delivery times and undelivered goods, which may lead to an improvement in customer service and/or a reduction in delivery costs. Other benefits may also be recognized by those skilled in the art.

In some embodiments, a computing device is configured to obtain historical order data identifying a plurality of previous orders. The computing device may configured to determine a first plurality of features based on the historical order data. The computing device may be further configured to train a plurality of binary trees with the determined first plurality of features, where each binary tree may provide for an input, a first output, and a second output. Additionally, training the plurality of trees comprises determining a comparison value for each binary tree.

In some examples, the computing device is configured to receive first data identifying a machine learning model, and generate the plurality of binary trees based on the first data. In some examples, the computing device is configured to receive first data identifying at least one order for delivery, and determine a second plurality of features based on the first data. The computing device may also be configured to determine one of the first output and the second output for each binary tree based on providing the second plurality of features to the plurality of binary trees. The computing device may also be configured to determine an estimated delivery time for the at least one order based on the determined ones of the first output and the second output for the plurality of binary trees.

In some examples, the computing device is configured to receive first data identifying an origin address and a destination address for delivery of an order, and determine a second plurality of features based on the first data. The computing device may also be configured to determine one of the first output and the second output for each binary tree based on providing the second plurality of features to the plurality of binary trees. The computing device may be further configured to determine a vehicle route for delivery of the order based on the determined ones of the first output and the second output for the plurality of binary trees.

In some embodiments, a method is provided that includes obtaining historical order data identifying a plurality of previous orders. The method may also include determining a first plurality of features based on the historical order data. The method may further include training a plurality of binary trees with the determined first plurality of features, where each binary tree may provide for an input, a first output, and a second output. Additionally, training the plurality of trees comprises determining a comparison value for each binary tree.

In some examples, the method includes receiving first data identifying a machine learning model, and generating the plurality of binary trees based on the first data. In some examples, the method includes receiving first data identifying at least one order for delivery, and determining a second plurality of features based on the first data. The method may also include determining one of the first output and the second output for each binary tree based on providing the second plurality of features to the plurality of binary trees. The method may further include determining an estimated delivery time for the at least one order based on the determined ones of the first output and the second output for the plurality of binary trees.

In some examples, the method includes receiving first data identifying an origin address and a destination address for delivery of an order, and determining a second plurality of features based on the first data. The method may also include determining one of the first output and the second output for each binary tree based on providing the second plurality of features to the plurality of binary trees. The method may further include determining a vehicle route for delivery of the order based on the determined ones of the first output and the second output for the plurality of binary trees.

In yet other embodiments, a non-transitory computer readable medium has instructions stored thereon, where the instructions, when executed by at least one processor, cause a device to perform operations that include obtaining historical order data identifying a plurality of previous orders. The operations may also include determining a first plurality of features based on the historical order data. The operations may further include training a plurality of binary trees with the determined first plurality of features, where each binary tree may provide for an input, a first output, and a second output. Additionally, training the plurality of trees comprises determining a comparison value for each binary tree.

In some examples, the operations include receiving first data identifying a machine learning model, and generating the plurality of binary trees based on the first data. In some examples, the operations include receiving first data identifying at least one order for delivery, and determining a second plurality of features based on the first data. The operations may also include determining one of the first output and the second output for each binary tree based on providing the second plurality of features to the plurality of binary trees. The operations may further include determining an estimated delivery time for the at least one order based on the determined ones of the first output and the second output for the plurality of binary trees.

In some examples, the operations include receiving first data identifying an origin address and a destination address for delivery of an order, and determining a second plurality of features based on the first data. The operations may also include determining one of the first output and the second output for each binary tree based on providing the second plurality of features to the plurality of binary trees. The operations may further include determining a vehicle route for delivery of the order based on the determined ones of the first output and the second output for the plurality of binary trees.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 5A illustrates a diagram of an example binary decision tree in accordance with some embodiments;

FIG. 5B illustrates a diagram of another example binary decision tree in accordance with some embodiments;

DETAILED DESCRIPTION

Figure 1:
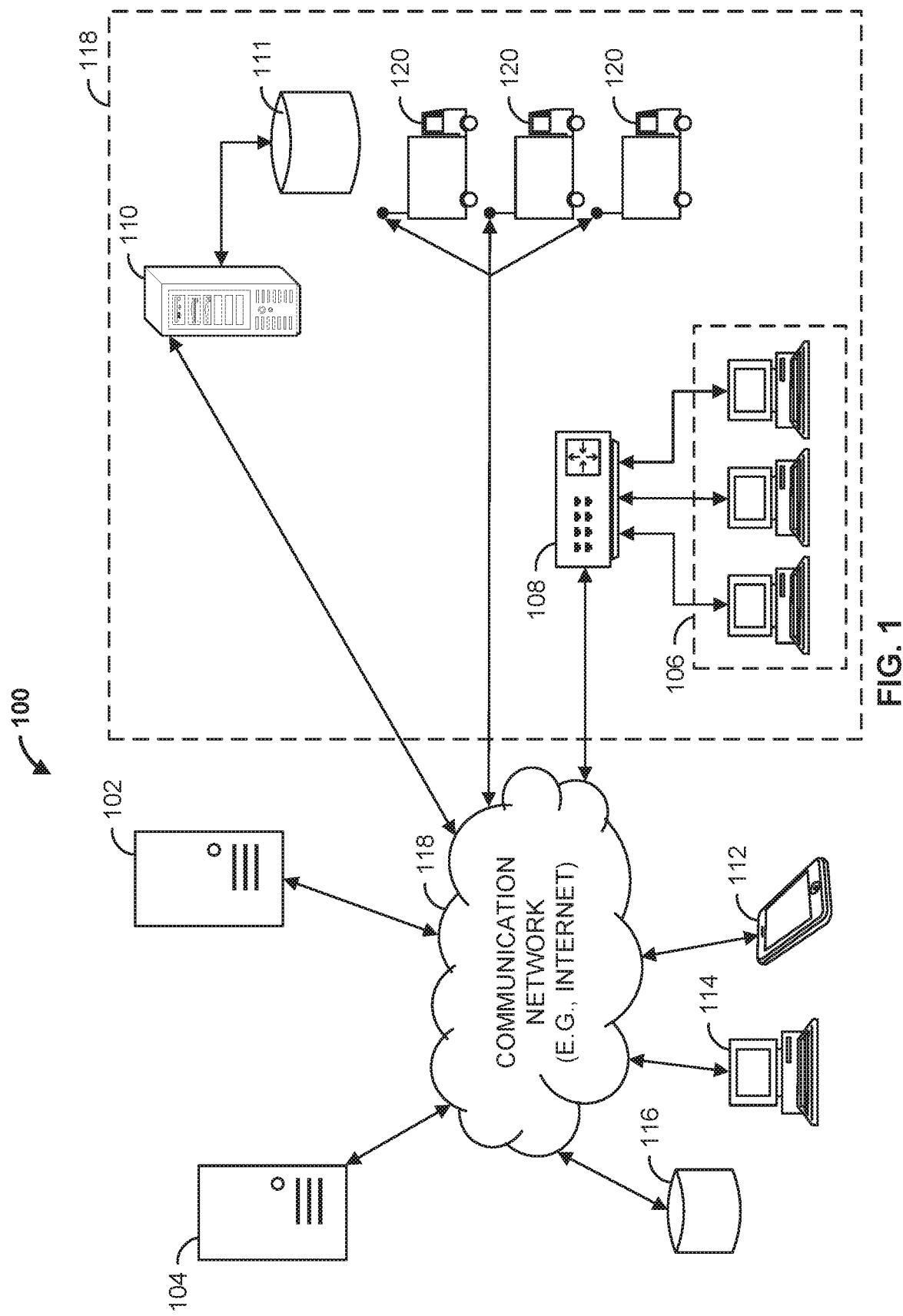
FIG. 1 is a block diagram of a delivery management system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Among various advantages, the embodiments described herein can reduce response times for sequential queries (e.g., route queries, delivery time window queries). The embodiments may also increase estimates, such as delivery time estimates, reduce delivery uncertainties, and simplify maintenance of employed machine learning models. Persons of ordinary skill in the art would recognized additional advantages as well.

Turning to the drawings, FIG. 1 illustrates a block diagram of a delivery management system 100 that includes a delivery management computing device 102 (e.g., a server, such as an application server), a web hosting device 104 (e.g., a web server), workstation(s) 106, database 116, scheduling server 110, and multiple customer computing devices 112, 114 operatively coupled over network 118. Delivery management system 100 may also include one or more delivery vehicles 120, which may be operated by delivery personnel. The delivery personnel may operate a computing device. Delivery management computing device 102, web hosting device 104, workstation(s) 106, scheduling server 110, and multiple customer computing devices 112, 114 can each be any suitable computing device that includes any hardware or hardware and software combination for processing and handling information. In addition, each can transmit data to, and receive data from, communication network 118.

For example, each of delivery management computing device 102, web hosting device 104, workstation(s) 106, scheduling server 110, and multiple customer computing devices 112, 114 can be a computer, a workstation, a laptop, a mobile device such as a cellular phone, a web server, an application server, a cloud-based server, or any other suitable device. Each can include, for example, one or more processors, one or more field-programmable gate arrays (FPGAs), one or more application-specific integrated circuits (ASICs), one or more state machines, digital circuitry, or any other suitable circuitry.

Although FIG. 1 illustrates two customer computing devices 112, 114, delivery management system 100 can include any number of customer computing devices 112, 114. Similarly, delivery management system 100 can include any number of workstation(s) 106, 108, scheduling servers 110, delivery management computing devices 102, delivery vehicles 120, web hosting devices 104, and databases 116.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Delivery management computing device 102, web hosting device 104, workstation(s) 106, 108, and scheduling server 110 may be operated by a retailer. Customer computing devices 112, 114 may be computing devices operated by customers of a retailer. In some examples, web hosting device 104 hosts one or more web pages for the retailer. Each customer computing device 112, 114 may be operable to access the one or more webpages hosted by web hosting device 104 over communication network 118. For example, a customer operating a customer computing device 112, 114 may view a retailer's website hosted by web hosting device 104 as displayed by the customer computing device 112, 114, and may purchase products, such as goods or services, from the retailer's website by interacting with the website via the customer computing device 112, 114. The customer may also be able to request that the order be delivered. In some examples, scheduling server 110 is operable to schedule the orders for delivery with delivery vehicles 120. For example, upon receiving a request for the delivery of an order, scheduling server 110 may schedule the order to be delivered by a delivery associate operating delivery vehicle 120. The delivery associate may receive the request via a computing device, such as a mobile device. Scheduling server 110 is communicatively coupled to database 111, which may store scheduling data identifying the scheduled orders.

Workstation(s) 106, 108 may be operably coupled to communication network 118 via a router (or switch) 108. As such, workstation(s) 106, 108 can communicate with delivery management computing device 102 over communication network 118. For example, workstations(s) 106, 108 may transmit data, such as purchase order data, to delivery management computing device 102. Similarly, workstation(s) 106, 108 may receive data from delivery management computing device 102. Workstation(s) 106, 108 along with router 108 may be located at a retail location 118, such as a store or warehouse where purchased items are stored. Scheduling server 110 may also be located at retail location 118, and may schedule orders for delivery to be delivered from retail location 118 by delivery associates operating delivery vehicles 120.

Delivery management computing device 102 is operable to communicate with database 116 over communication network 118. For example, delivery management computing device 102 can store data to, and read data from, database 116. Database 116 may be a tangible, non-transitory memory. For example, database 116 may be a remote storage device, such as a cloud-based server, a memory device on another application server, a networked computer, or any other suitable remote storage. Although shown remote to delivery management computing device 102, in some examples, database 116 can be a local storage device, such as a hard drive, a non-volatile memory, or a USB stick. Database 116 may store purchase order data. For example, a customer may purchase good from a retailer's website hosted by web hosting device 104. Web hosting device 104 may store purchase order data identifying and characterizing the order in database 116. Delivery management computing device 102 may then obtain the purchase order data from database 116.

Delivery management computing device 102 can generate a machine learning model, and train the machine learning model, before deploying the machine learning model to operate on current (e.g., real-time) transactions. The machine learning model may be a decision tree based model, such as one based on XGBoost. For example, delivery management computing device 102 may convert each booster of an XGBoost model to its own binary tree, where each node of each booster corresponds to a node in the binary tree. Further, each node in the binary tree may be associated with an index, which corresponds to a feature the node represents.

For example, and as illustrated in FIG. 5A, a binary decision tree 500 may include a decision block 502 where a determination is made. In this example, a determination is made as to whether an age (e.g., an age of the person) is below twenty. The age may be data identifying a determined feature (e.g., delivery management computing device 102 employed a feature extractor to extract the age from data). Based on whether the age is below twenty, a score is determined. For example, if the age is below twenty, a first score 508 of "2" is generated at block 504 (i.e., the "Y" path). If, however, the age is not below twenty, a second score 510 of "−1" is generated at block 506 (i.e., the "N" path).

FIG. 5B illustrates a binary decision tree 550 that includes a decision block 552 where a determination is made. In this example, a determination is made as to whether a computer is used daily. Features identifying whether the computer is used daily (e.g., daily for a previous period of time, such as the last 30 days) may be extracted from data, for example. Based on whether the computer is used daily, a score is determined. For example, if the computer is used daily, a first score 558 of "0.9" is generated at block 554 (i.e., the "Y" path). If, however, the computer is not used daily (i.e., the "N" path), a second score 560 of "−0.9" is generated at block 556.

Figure 5C:
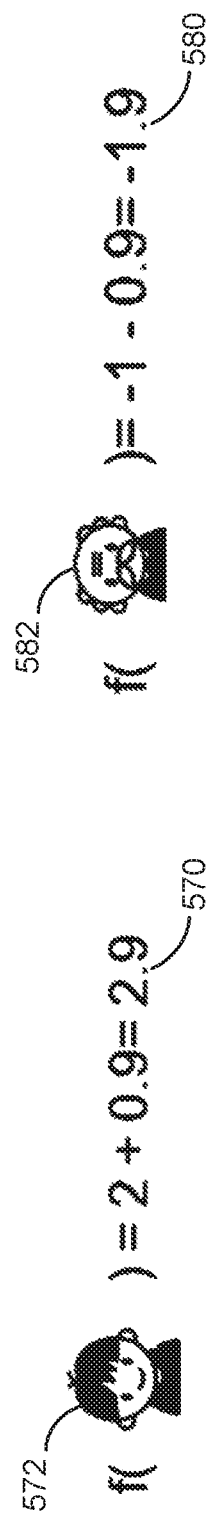
FIG. 5C illustrates computations based on the binary decision trees of FIGS. 5A and 5B in accordance with some embodiments.

The machine learning algorithm may comprise one or more trees. For example, a machine learning algorithm may comprise binary decision trees 500 and 550 of FIGS. 5A and 5B, respectively. In FIG. 5C, a first final score 570 is generated for a first person 572. The first final score 570 is computed based on scores generated for first person 572 from each of decision trees 500 and 550. For example, if first person 572 is below the age of twenty, binary decision tree 500 generates first score 508 of "2." In addition, if first person 572 uses a computer daily, binary decision tree 550 generates first score 558 of "0.9." In this example, each of the scores from binary decision trees 500, 550 are added together. Thus, first final score 570 is computed as 2.9 (i.e., 2 plus 0.9).

Likewise, in FIG. 5C, a second final score 580 is generated for a second person 582. The second final score 580 is computed based on scores generated for second person 582 from each of decision trees 500 and 550. For example, if second person 582 is not below the age of twenty, binary decision tree 500 generates second score 510 of "4." In addition, if second person 582 does not use a computer daily, binary decision tree 550 generates second score 560 of "−0.9." In this example, each of the scores from decision trees 500, 550 are added together. Thus, second final score 580 is computed as −1.9 (i.e., −1 plus −0.9).

In some examples, delivery management computing device 102 makes a determination based on a final score. For example, delivery management computing device 102 may compare the final score to a threshold to make the determination. If the final score is at or above a threshold, a first determination is made. If the final score is below the threshold, a second determination is made. Here, delivery management computing device 102 can make a determination associated with first person 572 based on first final score 570. Likewise, delivery management computing device 102 can make a determination associated with second person 582 based on second final score 580.

Delivery management computing device 102 can employ the machine learning model to determine routes for delivery vehicles delivery time windows 120. Delivery management computing device 102 can also generate the machine learning model to determine delivery time windows for deliveries made by delivery vehicles 120. The machine learning model may include a plurality of self-defined trees (e.g., boosters), where each decision tree includes one or more levels where, at each level, one or more decision tree decisions are executed. Each decision tree can generate a final value (e.g., score), wherein a decision is made based on the final score of all of the decision trees.

The machine learning model may be trained with historical data, such as data identifying previous transactions, delivery times, and delivery routes (e.g., GPS data). For example, the machine learning model can be trained according to the following process. First, delivery management computing device 102 loads historical data from database 116. Delivery management computing device 102 employs a feature extractor to identify (e.g., extract) features from the historical data. The machine learning model is then trained based on the identified features. Features may include, for example, origin and destination data (e.g., GPS data), previous delivery duration times, previous delivery route data, travel times, doorstep times, loading times, and order data (e.g., the number of items delivered, the size and weight of each item, etc.).

The loading time includes the amount of time to pick up purchased goods from retail location 118 and load them onto delivery vehicle 120. The travel time includes the travel time from a previous location to a delivery destination. For example, the travel time for a first delivery may include the travel time from retail location 118 to the delivery address of the first delivery. The travel time for a second delivery may include the travel time from the delivery address of the first delivery to the delivery address of the second delivery. The doorstep time includes a time difference between when the driver of delivery vehicle 120 leaves the delivery vehicle 120, after arriving at a delivery destination, to deliver an order, and when the driver re-enters delivery vehicle 120.

As a result of the training, machine learning parameters may be identified. The machine learning model may apply or compare the machine learning parameters to one or more of the features. As the machine learning model is trained, the machine learning parameters may be added or removed from the machine learning model. In some examples, the machine learning parameters are tuned based on the results of the training. For example, delivery management computing device 102 may adjust weights (e.g., increased or decreased) applied to various machine learning parameters until a desired threshold (e.g., percentage) of correct decisions are made. For example, the machine learning model may be scored as its being trained to determine errors between actual and forecast delivery window times and/or fastest delivery routes. If the machine learning model scores below a threshold, machine learning parameters may be added, removed, or tuned.

To determine the errors, a scoring metric can be generated. In some examples, the scoring metric is generated according to a root mean square error algorithm, such as one based on the equation below:

$$\sqrt{\frac{1}{N}\sum_{t=1}^{N}(\text{Actual}_t - \text{Forecast}_t)^2} \quad (\text{eq. 1})$$

In some examples, the scoring metric is generated according to a mean absolute percentage error (MAPE) algorithm, such as one based on the equation below:

$$\frac{1}{N}\sum_{t=1}^{N}\frac{\text{ABS}(\text{Actual}_t - \text{Forecast}_t)}{\text{Actual}_t} * 100\% \quad (\text{eq. 2})$$

In some examples, the scoring metric is generated according to a weighted MAPE algorithm, such as one based on the equation below:

$$\frac{\sum_{t=1}^{N}\text{ABS}(\text{Actual}_t - \text{Forecast}_t)}{\sum_{t=1}^{N}\text{Actual}_t} * 100\% \quad (\text{eq. 3})$$

In some examples, the scoring metric is generated according to a symmetric MAPE algorithm, such as one based on the equation below:

$$\frac{100\%}{N}\sum_{t=1}^{N}\frac{|\text{Actual}_t - \text{Forecast}_t|}{(\text{Actual}_t + \text{Forecast}_t)/2} \quad (\text{eq. 4})$$

In some examples, a response time for a decision is also measured. Machine learning parameters may be added, removed, or tuned based on response times. For example, if response times are too slow (e.g., a response is not determined until after a threshold of time), the machine learning parameters may be adjusted.

Once the machine learning model is trained, delivery management computing device 102 may employ the machine learning model to determine deliver time windows for current transactions, such as real-time transactions. For example, delivery management computing device 102 may receive order data identifying a plurality of orders for delivery. Delivery management computing device 102 may extract features for each of the plurality of orders, and may execute the trained machine learning algorithm, which operates on the extracted features.

Based on the output of the machine learning algorithm, delivery management computing device 102 can determine one or more delivery time windows for the plurality of orders. For example, delivery management computing device 102 may determine that the next available time window to deliver the plurality of orders is a two hour window (e.g., 3 pm to 5 pm). In some examples, delivery management computing device 102 may identify a plurality of time windows for delivery, along with an overall amount of time estimated to deliver the plurality of goods. For example, delivery management computing device 102 may generate data identifying that the next available delivery time window to deliver the plurality of orders is between 5 pm and 7 pm, and the deliveries will take 1 hour and 35 minutes. Delivery management computing device 102 may also generate data identifying that the plurality of orders may also be delivered between 7 pm and 9 pm, and the deliveries will take just one hour.

The delivery time windows may be transmitted to scheduling server 110, which may then schedule the plurality of orders with one or more of the delivery vehicles 120. Delivery personnel operating delivery vehicle 120 may proceed to pick up the plurality of orders from retail location 118, place the purchased items in delivery vehicle 120, and proceed to deliver the plurality of orders within the delivery time window.

In some examples, delivery management computing device 102 can determine, based on execution of the machine learning algorithm, one or more routes that a delivery vehicle 120 can take to deliver the plurality of orders. For example, delivery management computing device 102 may determine a fastest route, during a destination time window, to deliver the plurality of orders. The route may be transmitted to delivery vehicle 120 to deliver the plurality of orders during the delivery time window.

In some examples, delivery management computing device 102 may notify scheduling server 110 when delivery vehicle 120 arrives at retail location 118 to pick up the purchased goods for delivery of the batched order. Delivery management computing device 102 is operable to track the location of delivery vehicle 120 using any suitable tracking technology, such as the Global Positioning System (GPS). For example, delivery vehicle 120, or the computing device operated by the driver of delivery vehicle 120, may be GPS enabled.

Delivery management computing device 102 may maintain status for each delivery vehicle 120, which may be stored in database 116. For example, delivery management computing device 102 may generate a status of "accepted" for each order (i.e., delivery) of the plurality of orders. Upon delivery vehicle 120 picking up the batched orders at retail location 118, delivery management computing device 102 may change the status for each of the plurality of orders to "picked up." Once delivery vehicle 120 begins to leave retail location 118 to deliver the first order, delivery management computing device 102 may change the status of the first order to "enroute" or "enroute to dropoff." In some examples, delivery management computing device 102 generates a communication, such as an email or SMS (e.g., text message) to the customer (via, e.g., customer computing device 112, 114). The communication may include an indication that the delivery vehicle 120 is enroute to deliver the first order. In some examples, the communication includes an estimated arrival time for the first order (e.g., a tracking email).

Once delivery vehicle 120 arrives at the delivery address for the first order, delivery management computing device 102 may change the status of the first order to "at customer location." If the driver is able to deliver the purchased goods, the driver may so indicate via the computing device. Upon receiving an indication that the purchased goods were delivered, delivery management computing device 102 may change the status of the first order to "delivered." If, however, the purchases goods were not delivered (e.g., customer was not home, or customer rejected one or more of the items for delivery), delivery management computing device 102 may change the status of the first order to "rejected." The driver may then move on to deliver the next order of the batched order. In some examples, delivery management computing device 102 generates a communication to the customer indicating a delivery attempt was made and, in some examples, provides an option to reschedule the delivery.

In some examples, the machine learning model is implemented in software, such as in Java code (e.g., a JSON file). For example, the machine learning model may be defined by a data structure and algorithm implemented in Java.

Figures 6A, 6B:
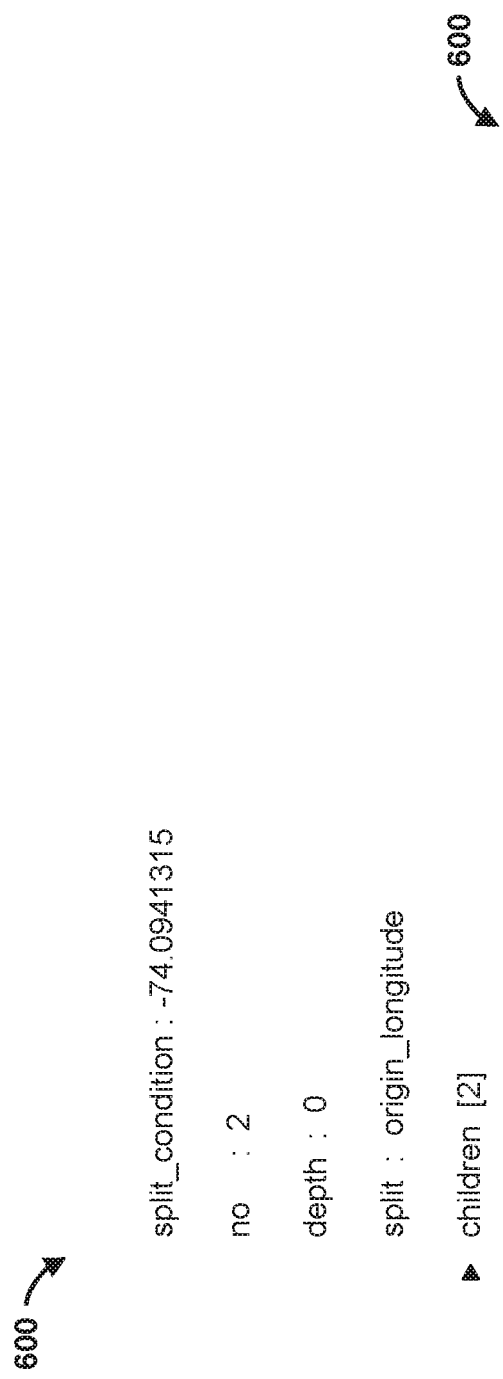
FIGS. 6A and 6B illustrate exemplary textual representations of nodes of a decision tree in accordance with some embodiments.

FIG. 6A illustrates a decision node of a decision tree implemented in a JSON structure 600 that may be part of an XGBoost based machine learning model. In this example, the JSON structure 600 includes a "split_condition" field, a "no" field, a "depth" field, a "split" field, a "children" field (in this example, and array of two), a "yes" field, a "missing" field, a "nodeid" field. The "nodeid" field identifies a node ID for the decision tree, and the "depth field" identifies the depth of the decision tree, i.e., the number of decision levels (e.g., node levels) within the decision tree.

Field "split_condition" identifies a value of a threshold amount that is compared to an input the decision tree receives. The input may be a resultant value (e.g., score) from a previous node, or may be a value based on one or more extracted features. The "children" field identifies two paths which may be taken depending on the result of the comparison. Each path may lead to another node within the decision tree, or to an end node that defines a final value (e.g., a "leaf" node). In this example, one child is identified by the "no" field, and one child is identified by the "yes" field. For example, each of the "no" and "yes" fields may identify node IDs. The "no" field may identify a node ID when the input is greater than or equal to the value identified by the "split_condition" field, and the "yes" field may identify a node ID when the input is less than the value identified by the "split_condition" field.

The "split" field identifies the name of a feature used for the input. For example, a value corresponding to the "split field" may be obtained, such as from database 116. The obtained value may be used as the input to the decision tree (e.g., compared to the value identified by the "split_condition" field as described above). In some examples, a value for the "split" field may be missing. For example, there may be no value associated with the "split" field because the feature is not available in a particular instance. In these examples, the "missing" field identifies a node ID for a missing value. For example, rather than proceeding to the node ID identified by the "yes" or "no" fields, the decision tree proceeds to the node ID identified by the "missing" field.

FIG. 6B illustrates a leaf node of the decision tree implemented in the JSON structure 600 of FIG. 6A. In this example, the leaf node includes a "leaf" field and a "nodeid" field. The "nodeid" field identifies a node ID for the leaf node. The "leaf" field identifies a score (e.g., a value, a classification) for the leaf node. For example, after proceeding through various node levels (e.g., as identified by the "depth" field), the decision tree may arrive at a leaf node that identifies a final score for the decision tree. A decision tree may include a plurality of leaf nodes.

Figure 7:
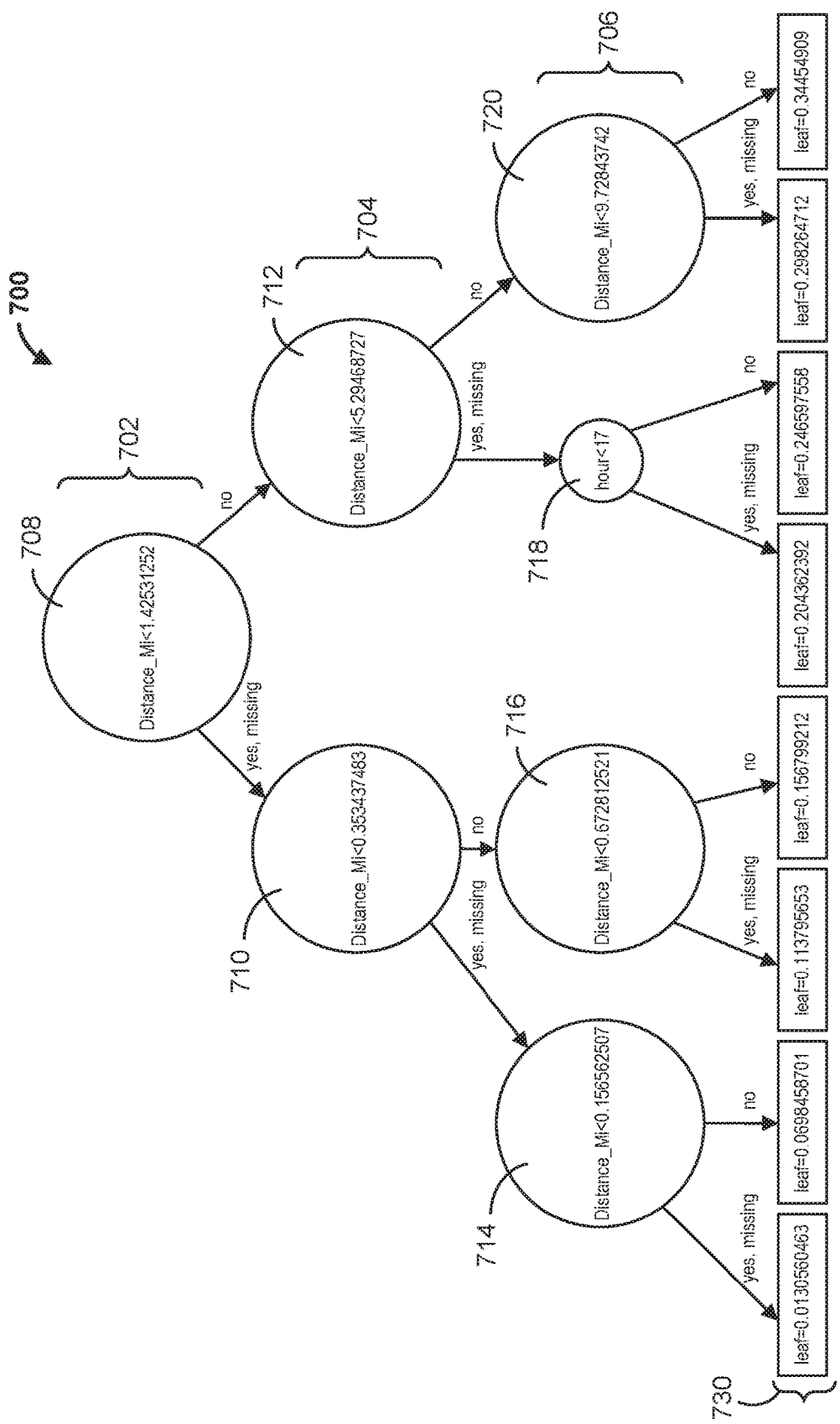
FIG. 7 illustrates an exemplary decision tree with a plurality of depth levels in accordance with some embodiments.

FIG. 7 illustrates a decision tree (e.g., booster) 700 that includes a plurality of depth levels 702, 704, 706. For example, a "depth" field generated for decision tree 700 may identify a value of "3." At each depth level, one or more decisions are made by decision nodes. For example, at depth level 702, decision node 708 is executed to make a decision. Based on the decision, either decision node 710 or decision node 712, each at decision level 704, is executed. Based on the decision made at either decision node 710 or decision node 712, one of decision nodes 714, 716, 718, and 720 are executed. Based on the resultant decision of the decision node 714, 716, 718, 720 executed, one of a plurality of leaf nodes 730 are executed to determine a final score for the decision tree 700.

Delivery management computing device 102 may generate a forest consisting of a plurality of indexed binary trees (e.g., such as a plurality of decision trees 700). For example, each binary tree may include input fields such as index, value (e.g., parameter being evaluated), left child (e.g., a "yes" path), and right child (e.g., a "no" path). For each binary tree, a prediction value (e.g., leaf value) is generated based on the query (e.g., based on the features extracted from a query). Based on the prediction values for all of the binary trees, delivery management computing device 102 generates an output of the machine learning algorithm. For example, delivery management computing device 102 may sum the prediction values from all of the binary trees of the machine learning algorithm to generate a final prediction value. Based on the final prediction value, delivery management computing device 102 may determine delivery time windows and/or delivery routes (e.g., based on what the machine learning algorithm was trained for). In some examples, delivery management computing device 102 evaluates the performance of the machine learning algorithm based on actual values (e.g., actual delivery times) determined for the orders.

In some examples, the machine learning algorithm is represented by the following equation:

$$\hat{y}_i = \Sigma_{k=1}^{K} f_k(x_i), f_k \in \mathcal{F} \quad \text{(eq. 5)}$$

where:
K is the number of trees;
$f$ is a function of function space F; and
F is the set of all possible regression trees.

Delivery management computing device 102 can, in some examples, generate a tree based machine learning algorithm according to the above equation. A corresponding objective function can be represented by the following equation:

$$obj(\theta) = \Sigma_i^n (y_i, \hat{y}_i) + \Sigma_{k=1}^{K} \Omega(f_k) \quad \text{(eq. 6)}$$

where: the first term is the training loss term and the second term is the regularization term.

Delivery management computing device 102 can, in some examples, optimize the tree based machine learning algorithm according to the above equation.

Figure 2:
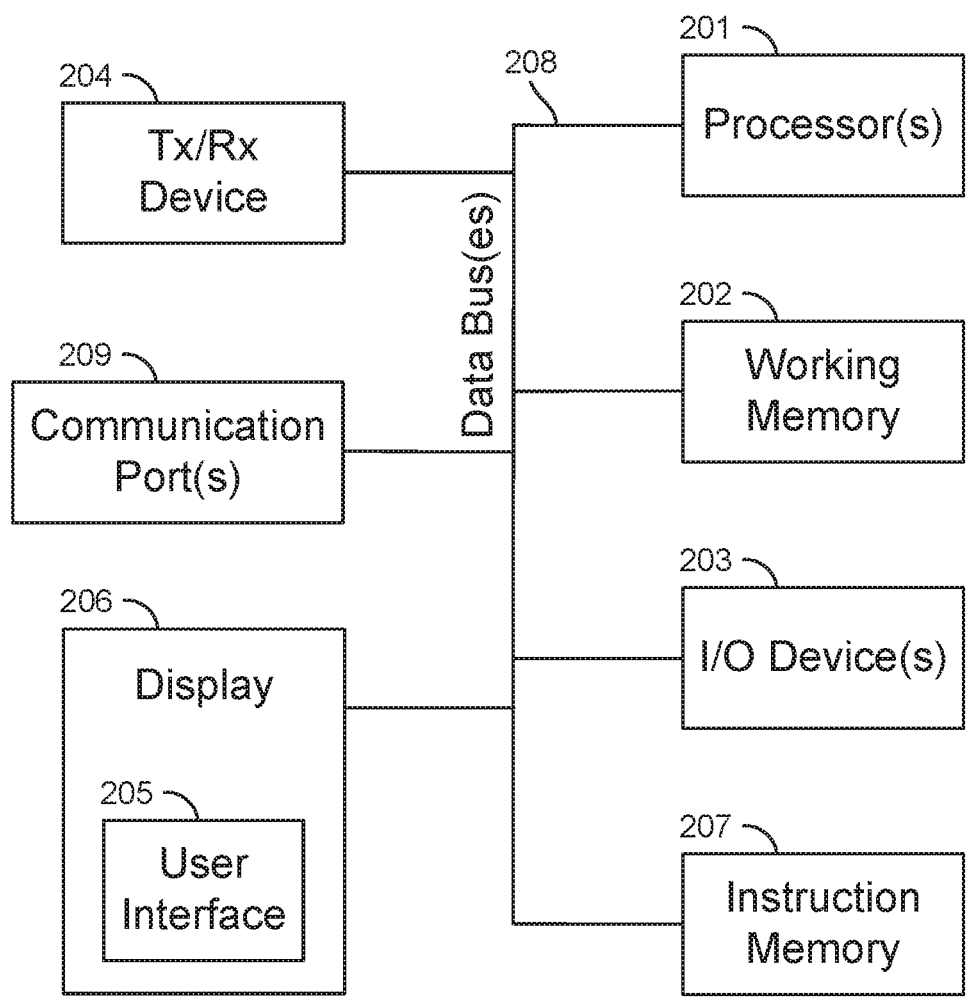
FIG. 2 is a block diagram of the delivery management computing device of FIG. 1 in accordance with some embodiments.

FIG. 2 illustrates the delivery management computing device 102 of FIG. 1. Delivery management computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of delivery management computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with delivery management computing device 102. For example, user interface 205 can be a user interface for an application that allows for the viewing of semantic representations of user queries. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 delivery management computing device 102 will be operating in. Processor(s) 201 is operable to receive data from, or send data to, a network, such as communication network 118 of FIG. 1, via transceiver 204.

Figure 3:
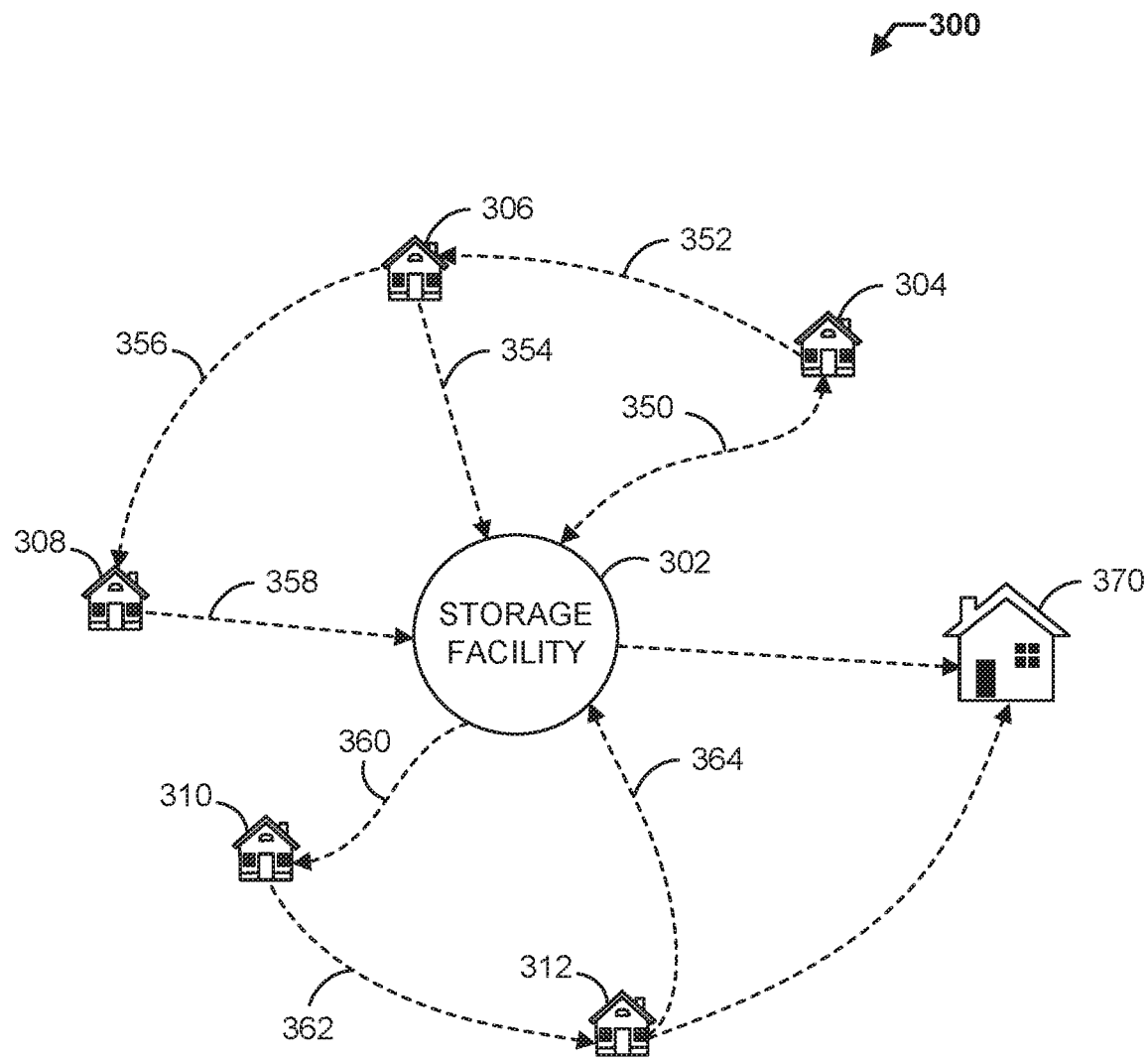
FIG. 3 illustrates an exemplary route map for one or more delivery vehicles employed in the delivery management system of FIG. 1 in accordance with some embodiments.

FIG. 3 illustrates a route map 300 representing delivery routes that may be generated by delivery management computing device 102 for one or more delivery vehicles 120. Route map 300 includes storage facility 302, which may be a retail location or warehouse where goods for delivery are stored, as well as customer locations 304, 306, 308, 310, 312. Route map 300 also illustrates driver home location 370, which may be a residence of a driver of a delivery vehicle 120.

Delivery management computing device 102 may schedule a delivery vehicle 120 to deliver one or more orders, which includes delivery of purchased goods to a plurality of delivery locations. For example, delivery management computing device 102 may transmit vehicle route data to a delivery vehicle 120 for delivery of one or more orders within a particular time slot (e.g., time window, such as a 2 or 3 hour time window). The vehicle route data may identify routes delivery vehicle 120 is to follow to deliver the orders. To determine the vehicle route data, delivery management computing device 102 may execute one or more machine learning algorithms, such as one based on decision trees (e.g., XGBoost based).

Before delivering the orders, delivery vehicle 120 may arrive at storage facility 302 to load the purchased goods onto the delivery vehicle 120. Delivery management computing device 102 may determine a route 350 from storage facility 302 to customer location 304. Although only one path 350 is illustrated from storage facility 302 to customer location 304 (for simplification purposes), in some examples, an estimated travel time along multiple paths are determined. Delivery management computing device 102 may generate vehicle route data identifying a route resulting in a soonest arrival time at customer location 304, for example.

Similarly, delivery management computing device 102 may generate vehicle route data identifying: route 352 from customer location 304 to customer location 306; route 356 from customer location 306 to customer location 308; route 354 from customer location 306 to storage facility 302; route 358 from customer location 308 to storage facility 302; route 362 from customer location 310 to customer location 312; route 360 from customer location 310 to storage facility 302; and route 364 from customer location 312 to storage facility 302.

Delivery management computing device 102 can also determine an arrival time at customer location 304 based on an estimated loading time at storage facility 302 to load the items for the batched orders, an estimated travel time from storage facility 302 to customer location 304 along route 350, and an estimated doorstep time at customer location 304 to deliver the purchased items for that delivery. The arrival time, and the arrival times discussed further below, may be determined based on execution of one or more machine learning algorithms, such as one based on decision trees (e.g., XGBoost based). Delivery management computing device 102 may transmit the estimated delivery time to another computing device, such as to customer computing device 112, to notify the customer of the estimated delivery time.

In some examples, delivery management computing device 102 updated estimated delivery times based on a current location of delivery vehicle 120. For example, delivery vehicle 120 may transmit GPS data to delivery management computing device 102. Delivery management computing device 102 may provide the GPS data to the machine learning algorithm to update an estimated delivery time at customer location 304. Delivery management computing device 102 may transmit the updated delivery time to customer computing device 112.

Similarly, delivery management computing device 102 may determine an estimated travel time from customer location 304 to customer location 306 along path 352, and an estimated doorstep time at customer location 306, to determine an estimated arrival time at customer location 306. Delivery management computing device 102 may add the estimated travel time, and the estimated doorstep time, to the arrival time at customer location 304, to determine the estimated arrival time at customer location 306.

Delivery management computing device 102 may also determine an estimated travel time from customer location 306 to customer location 308 along path 356, and an estimated doorstep time at customer location 308, to determine an estimated arrival time at customer location 308. Delivery management computing device 102 may add the estimated travel time, and the estimated doorstep time, to the arrival time at customer location 306, to determine the estimated arrival time at customer location 308.

In some examples, delivery vehicle 120 may need to return to storage facility 302 to load additional items into delivery vehicle 120 for delivery to customer location 308, or for other deliveries. In these examples, delivery management computing device 102 may determine a travel time from customer location 306 to storage facility 302 along a path 354, and a travel time from storage facility 302 to customer location 308 along path 358. Delivery management computing device 102 may determine the arrival time at customer location 308 based on these estimated travel times, as well as an estimated time at storage facility 302 to load the items onto delivery vehicle 120.

Similarly, delivery management computing device 102 may determine an arrival time at customer location 310 based on an estimated travel time from storage facility 302 to customer location 310 along path 360. Delivery management computing device 102 may also determine an estimated arrival time at customer location 312 based on an estimated travel time from customer location 310 to customer location 312 along path 362. In some examples, delivery management computing device 102 determines an estimated arrival time at storage facility 302 after completing the delivery at customer location 312. The estimated arrival time may be transmitted to scheduling server 110, for example, to notify a retailer of when to expect the delivery vehicle 120 back at the storage facility 302. In some examples, delivery management computing device 102 determines a home arrival time for the driver of delivery vehicle 120. For example, delivery management computing device 102 can determine an estimated travel time from customer location 312 to driver home location 370, or from storage facility 302 to driver home location 370, and transmit the estimated home arrival time to delivery vehicle 120.

Figure 4A:
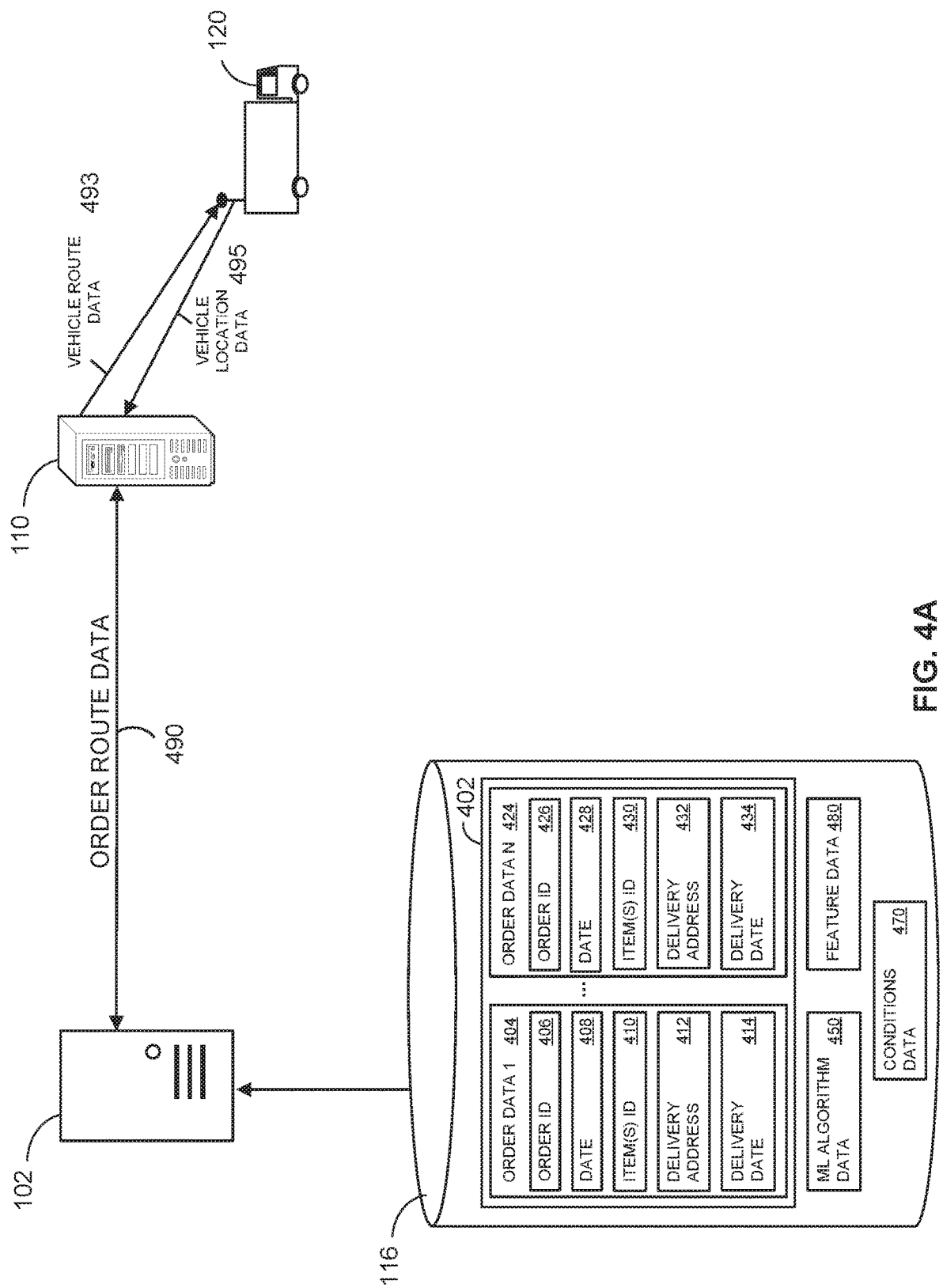
FIG. 4A illustrates a portions of the delivery management system of FIG. 1 in accordance with some embodiments.

FIG. 4A illustrates portions of the delivery management system 100 including delivery management computing device 102, scheduling sever 110, delivery vehicle 120, and database 116. In this example, delivery management computing device 102 generates order route data 490 identifying one or more delivery routes delivery vehicle 120 can take to deliver orders, such as orders identified by order data 402 stored in database 116. Order route data 490 can be generated based on the execution of a decision tree based machine learning algorithm, such as one based on XGBoost. For example, delivery management computing device 102 may obtain machine learning algorithm data 450 from database 116. Machine learning algorithm data 450 identifies and characterizes a decision tree based machine learning algorithm, which delivery management computing device 102 may execute. The machine learning algorithm identified by machine learning algorithm data 450 may have been trained, for example, with historical data.

To execute the machine learning algorithm, delivery management computing device 102 may determine one or more features to provide to the machine learning algorithm. For example, delivery management computing device 102 may execute a feature extractor that operates on order data 402 and conditions data 470 to extract features expected by the machine learning algorithm.

Order data 402 may identify a plurality of orders, such as first order data 404 and $N^{th}$ order data 424. First order data 404 may include an order ID 406 identifying the order, a date 408 (e.g., a date the order was placed), item IDs 410 identifying purchased items, a delivery address 412 (e.g., for delivery of the order), and a delivery date 414 (e.g., for delivery of the order). Similarly, $N^{th}$ order data 424 may include an order ID 426 identifying the order, a date 428, item IDs 430 identifying purchased items, a delivery address 432, and a delivery date 434.

Conditions data 470 may include any data identifying conditions, such as current conditions. For example, conditions data 470 can include a time of day, a date, current or predicted weather, current or predicted traffic conditions, whether a special event is planned (e.g., on a day or time), or any other condition data.

Delivery management computing device 102 may generate the features, and store feature data 480 identifying and characterizing the generated features in database 116. Delivery management computing device 102 may obtain feature data 480 from database 116, for example, and execute the machine learning algorithm identified by machine learning algorithm data 450.

Delivery management computing device 102 may transmit the order route data 490 to scheduling server 110. Scheduling server 110 may determine one or more delivery vehicles 120 to deliver orders associated with order route data 490. For example, scheduling server 110 may parse order route data 490 to generate vehicle route data 493 identifying at least a portion of the routes identified by order route data 490 for delivery by delivery vehicle 120. Scheduling server 110 may transmit vehicle route data 493 to scheduling server 110.

Upon receiving vehicle route data 493, delivery vehicle 120 may proceed to deliver associated orders, such as orders identified by order data 402. For example, delivery vehicle 120 may proceed along routes identified by vehicle route data 493 to deliver the orders.

Scheduling server 110 may, in some example, generate estimated delivery times. For example, scheduling server 110 may determine estimated delivery times for the orders based on the execution of one or more machine learning algorithms, such as one identified by machine learning algorithm data 450. In some examples, scheduling server 110 receives location information, such as GPS data, from delivery vehicle 120. The location information may include, for example, a latitude and longitude of delivery vehicle 120. Scheduling server 110 may update estimated delivery times (e.g., in real time) based on vehicle location data 495.

Figure 4B:
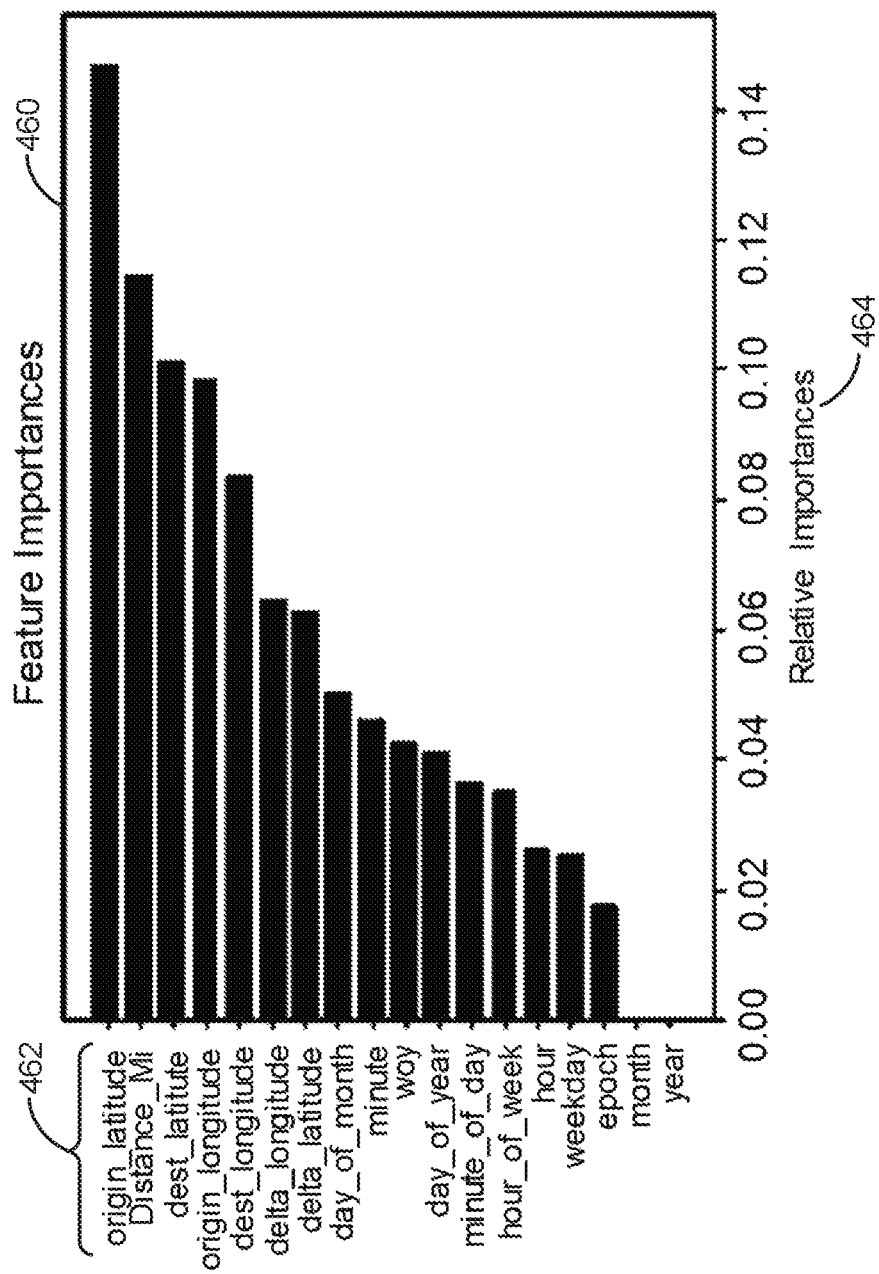
FIG. 4B illustrates a chart of example features in accordance with some embodiments.

FIG. 4B illustrates a chart 460 identifying features 462 along a vertical axis of the chart, and feature importance measurements 464 along a horizontal axis of the chart. Feature importance measurements 464 may be determined, for example, during training of the machine learning algorithm. In this example, features 462 include an origin latitude and an origin longitude (e.g., latitude and longitude of an origination location for deliveries), a distance (e.g., distance from origin to destination), a destination latitude and longitude, a delta latitude and delta longitude (e.g., the difference between the origin and destination latitudes and longitudes, respectively), day of month, a minute, a way, a day of year, a minute of the day, an hour of the week, an hour, a weekday, and epoch, a month, and a year. In this example, the origin latitude has the relatively greatest importance level (e.g., affects decisions of the machine learning algorithm the most of any other feature in the list). In some examples, features 462 are determined based on executing a feature extractor that operates on order data 402 and conditions data 470.

Figure 8:
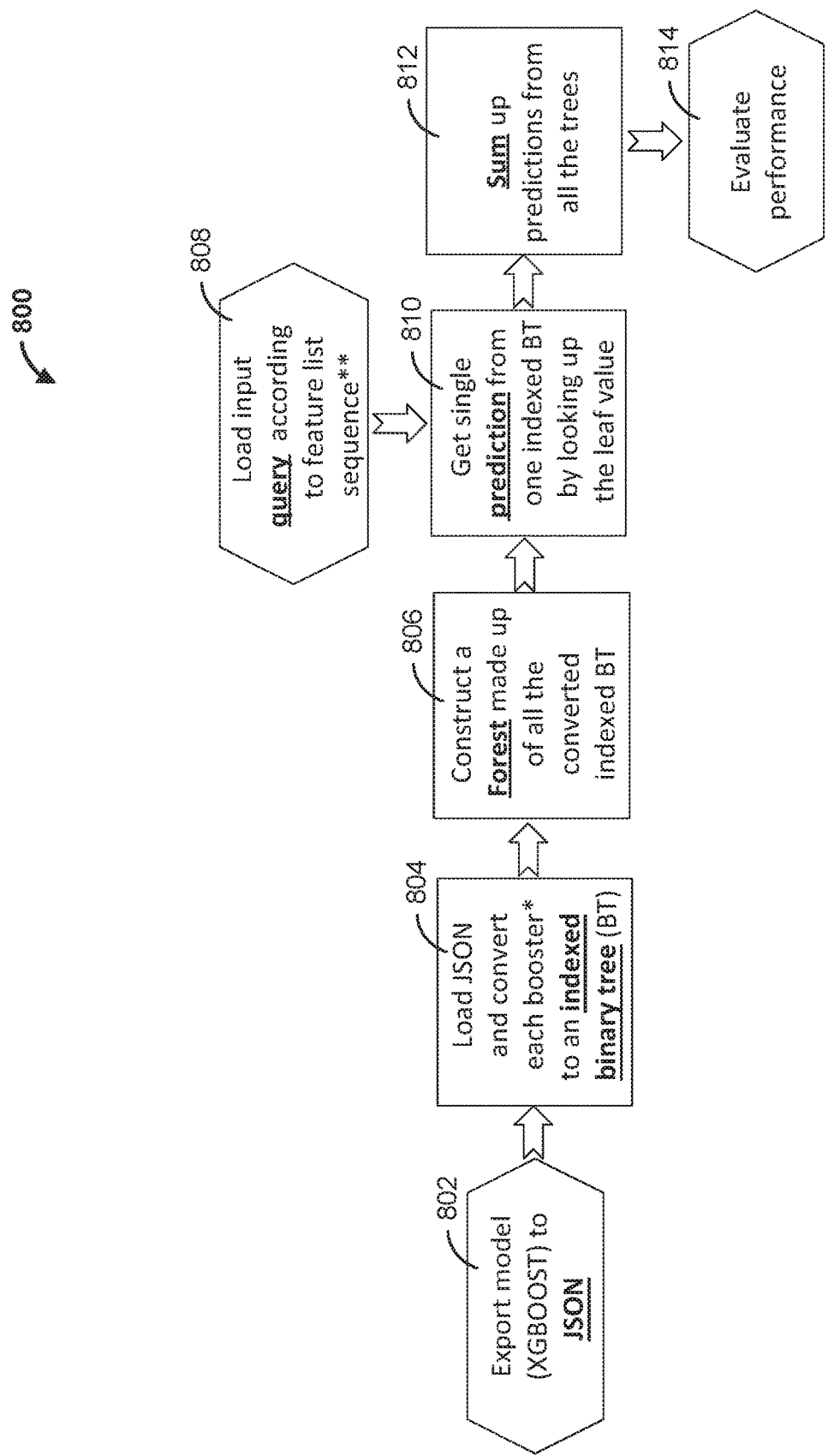
FIG. 8 illustrates example operations that can be carried out by the delivery management computing device of FIG. 1 in accordance with some embodiments.

FIG. 8 illustrates example operations 800 that can be carried out by the delivery management computing device 102 of FIG. 1. In this example, at block 802, delivery management computing device 102 exports a machine learning model, such as one based on XGBoost, to a file, such as a Java JSON file. The file identifies a plurality of boosters of the machine learning model. At block 804, the file is loaded, and each booster is converted to an indexed binary tree. For example, each booster (e.g., XGBoost booster) is converted to its own binary tree, where each node of each booster corresponds to a node in the binary tree. Further, each node in the binary tree may be associated with an index, which corresponds to a feature the node represents (e.g., a feature with a value identified in a "split_condition" field). At block 806, a forest is generated. The forest includes at least a portion (e.g., all) of the converted indexed binary trees.

At block 808, an input query is loaded based on a feature list sequence. The input query identifies one or more features for the forest to operate on. For example, the feature list sequence may include feature data 480. At block 810, a leaf value (e.g., score) is determined for each indexed binary tree of the forest. The leaf value is determined for each indexed binary tree based on the input query. For example, each binary tree compare at least a portion of the input query to a "split_condition." Based on the comparison, each binary tree generates either a first score or a second score.

At block 812, the generated scores of all of the binary trees are summed to generate a final score (e.g., forest score). At step 814, the performance of the forest is evaluated. For example, response times may be measured. If response times are below a threshold, the forest may satisfy response time requirements. Otherwise, if response times are at or above the threshold, the forest may fail the response time requirements. In addition, the forest may be evaluated for accuracy. For example, the final scores of the forest may be compared to final scores from other, more complex and time consuming, machine learning models. If the final scores match favorably (e.g., at or above some percentage threshold) with other results, the forest may satisfy accuracy requirements. Otherwise, if the final scores do not match favorably (e.g., below the percentage threshold) with the other results, the forest may not satisfy the accuracy requirements. If the forest fails any requirements, the forest may be retrained, and, in some examples, parameters, such as "split_condition" values, may be adjusted.

Figure 9:
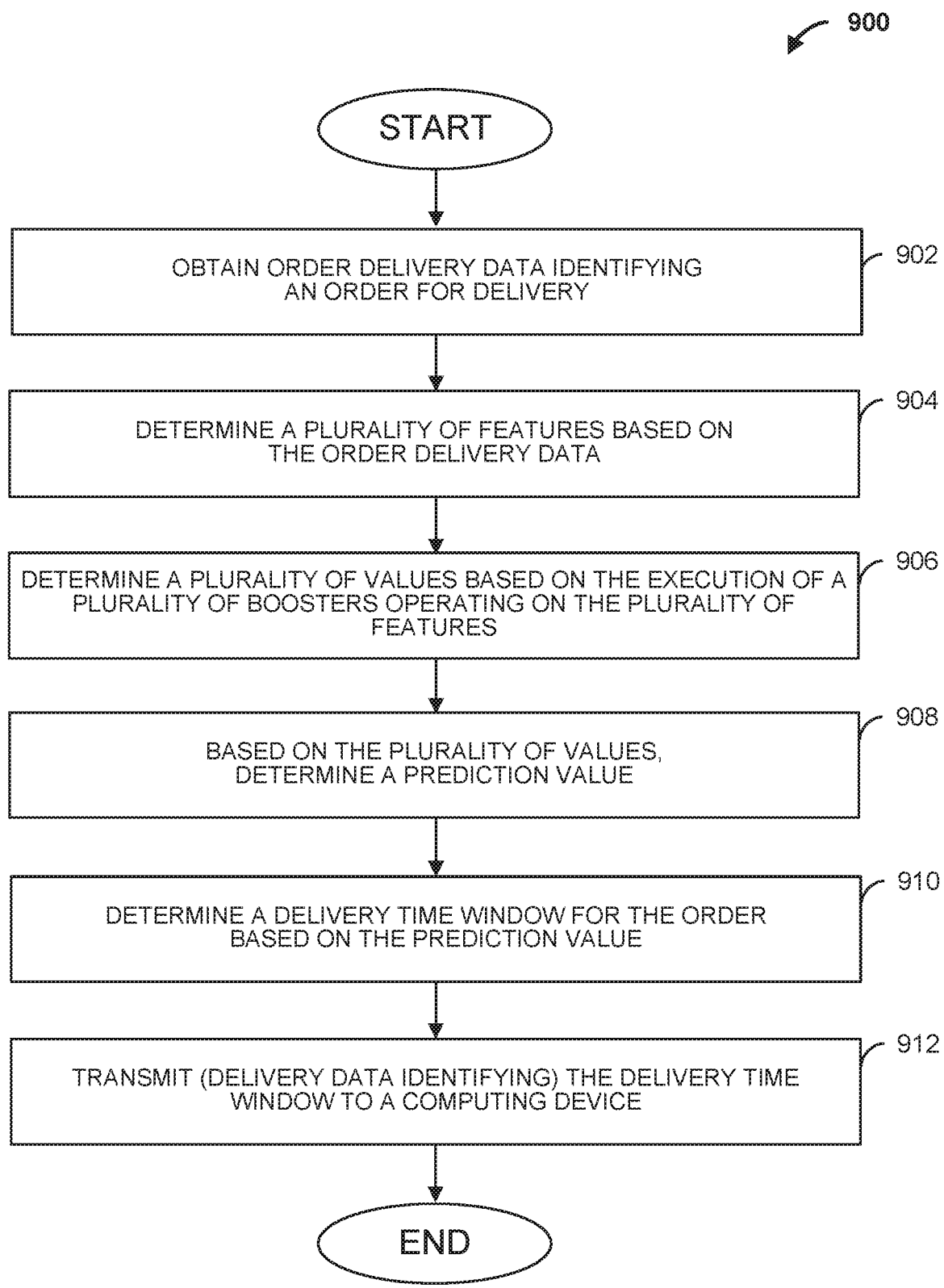
FIG. 9 illustrates a flowchart of an example method that can be carried out by the delivery management computing device of FIG. 1 in accordance with some embodiments.

FIG. 9 is a flowchart of an example method 900 that can be carried out by, for example, the delivery management computing device 102 of FIG. 1. Beginning at step 902, order delivery data, such as order data 402, is obtained. The order delivery data identifies a plurality of orders for delivery. At step 904, a plurality of features are determined based on the obtained order delivery data. For example, delivery management computing device 102 may execute a feature extractor to generate features based on the order delivery data.

Proceeding to step 906, a plurality of values are determined based on the execution of a plurality of boosters. The plurality of boosters operate on the plurality of features determined at step 904. For example, delivery management computing device 102 may execute a forest of indexed binary trees that make decisions, and generate leaf values, based on values associated with the plurality of features. At step 908, a prediction value is determined based on the plurality of values. For example, the prediction value may be a sum of the plurality of values generated by the boosters.

At step 910, a delivery time window for the order is determined based on the prediction value. For example, if the prediction value is at or above a threshold, a first delivery time window may be determined. Otherwise, if the prediction value is below the threshold, a second delivery time window may be determined. At step 912, the delivery time window is transmitted to a computing device. For example, delivery management computing device 102 may transmit the delivery time window to a customer computing device 112, 114, informing the customer of when to expect delivery of the order. The method then ends.

Figure 10:
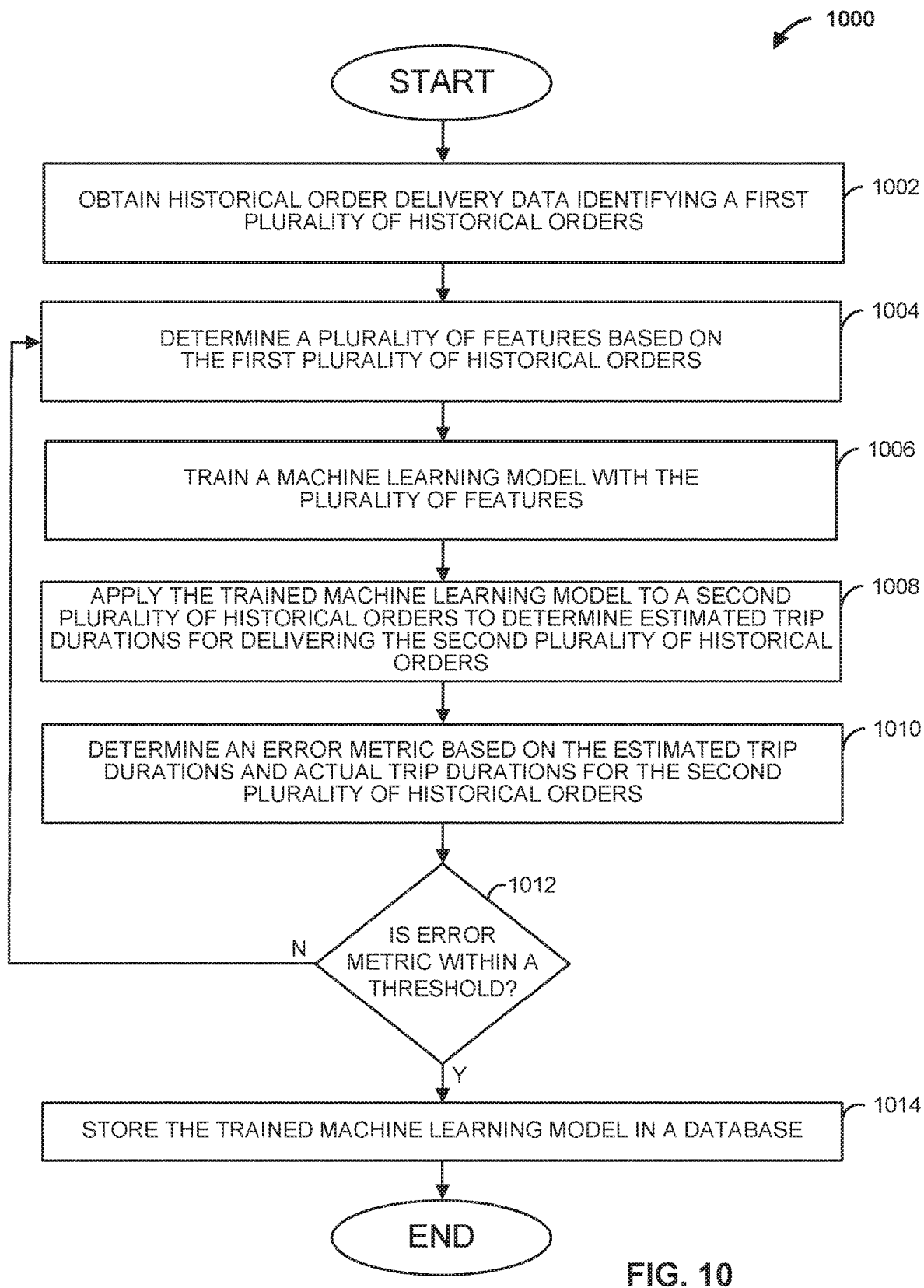
FIG. 10 illustrates a flowchart of another example method that can be carried out by the delivery management computing device of FIG. 1 in accordance with some embodiments.

FIG. 10 is a flowchart of another example method 1000 that can be carried out by, for example, the delivery management computing device 102 of FIG. 1. Beginning at step 1002, historical order delivery data is obtained. The order delivery data identifies a first plurality of historical orders. At step 1004, a plurality of features are determined based on the first plurality of historical orders. For example, delivery management computing device 102 may execute a feature extractor to generate the plurality of features based on the first plurality of historical orders. At step 1006, a machine learning model is trained with the plurality of features. The machine learning model may include a plurality of indexed binary trees, for example.

Proceeding to step 1008, the trained machine learning model is applied to a second plurality of historical orders to determine estimated trip durations for delivering the second plurality of historical orders. For example, delivery management computing device 102 may identify features in the second plurality of historical orders, such as features determined based on the training. delivery management computing device 102 may execute the machine learning model to determine the estimated trip durations.

At step 1010, an error metric is determined based on the estimated trip durations and actual trip durations for the delivery of the second plurality of historical orders. For example, delivery management computing device 102 may determine root mean square errors, mean absolute percentage errors (MAPE), weighted MAPE, or symmetric MAPE based on the estimated and actual trip durations.

At step 1012, a determination is made as to whether the error metric is within a threshold. If the error metric is within the threshold (e.g., less than or equal to the threshold), the method proceeds back to step 1004, where the machine learning model is further refined. Otherwise, if the error metric is not within the threshold (e.g., greater than the threshold), the method proceeds to step 1014. At step 1014, the trained machine learning model is stored in a database. For example, delivery management computing device 102 may store the trained machine learning model in database 116 as machine learning algorithm data 450. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a non-transitory memory having instructions stored thereon and a processor configured to read the instructions to:
obtain historical order data identifying a plurality of previous orders;
train a machine learning model using an iterative training process, wherein the iterative training process calculates an error between an estimated and an actual output, the error calculated including at least a mean absolute percentage error (MAPE) algorithm, a weighted MAPE algorithm, or a symmetric MAPE algorithm, configured to determine a first plurality of features in the historical order data, wherein the machine learning model includes a plurality of indexed binary trees with the determined first plurality of features, wherein each indexed binary tree is configured to receive an input and generate one of a first output or a second output, wherein the plurality of indexed binary trees are arranged in one or more decision trees configured to generate a final output value, and wherein training the plurality of indexed binary trees comprises determining a comparison value for each indexed binary tree, wherein at least one indexed binary tree includes a missing value node identifier identifying a next node of a corresponding decision tree when a feature value to be compared to the comparison value is missing, and wherein each indexed binary tree in the plurality of indexed binary trees is generated by converting a trained booster of an XGBoost model into the indexed binary tree;
optimize the trained machine learning model with a training loss term and a regularization term;
implement a feature extractor configured to extract a feature set, wherein the feature set is defined by the input expected by the plurality of indexed binary trees;
receive first data identifying a plurality of orders for delivery;
determine a second plurality of features based on the first data, wherein the second plurality of features is extracted by the feature extractor and corresponds to the feature set;
determine the final output for each decision tree based on providing the second plurality of features to the plurality of indexed binary trees and compare the final output with a threshold number determined by the trained machine learning model; and determine an estimated delivery time for each of the plurality of orders based on the determined final output for the one or more decision trees; and transmit a plurality of route assignments based on the determined estimated delivery time for each of the plurality of orders to a plurality of devices configured to receive at least one of the plurality of route assignments.

2. The system of claim 1, wherein the processor is further configured to:
receive second data identifying an origin address and a destination address for delivery of an order;
determine the second plurality of features based on the second data;
determine one of the first output and the second output for each indexed binary tree based on providing the second plurality of features to the plurality of indexed binary trees; and
determine a vehicle route for delivery of the order based on the determined final outputs for the one or more decision trees.

3. The system of claim 1, wherein determining the estimated delivery time comprises summing the determined final output for the one or more decision trees.

4. The system of claim 1, wherein the first plurality of features comprises an origin data, destination data previous delivery data, loading time data, and order data for each of the plurality of previous orders.

5. The system of claim 1, wherein determining the estimated delivery time for each of the plurality of orders comprises:
determining a loading time of each of the plurality of orders at a storage facility;
determining a travel time from the storage facility to a delivery address of each of the plurality of orders; and
determining the estimated delivery time based on the loading time and the travel time.

6. The system of claim 5, wherein the processor is further configured to transmit the estimated delivery time to a second computing device.

7. The system of claim 5, wherein the processor is further configured to:
generate a scoring metric based on the estimated delivery time and an actual delivery time for each of the plurality of orders; and
determine whether a performance requirement is satisfied based on the generated scoring metric.

8. The system of claim 1, wherein the iterative training process determines the error between forecast delivery window times and actual delivery times, and wherein at least one booster of the XGBoost model is modified based on the error.

9. The system of claim 1, wherein the processor is further configured to:
receive real-time location data of at least one of the plurality of devices; and
update an order status of at least one of the plurality of orders included in one of the plurality of route assignments provided to the at least one of the plurality of devices in response to a change in the real-time location data of the at least one of the plurality of devices.

10. A method comprising:
obtaining historical order data identifying a plurality of previous orders;
training a machine learning model using an iterative training process, wherein the iterative training process calculates an error between an estimated and an actual output, the error calculated including at least a mean absolute percentage error (MAPE) algorithm, a weighted MAPE algorithm, or a symmetric MAPE algorithm, configured to determine a first plurality of features in the historical order data, wherein the machine learning model includes a plurality of indexed binary trees with the determined first plurality of features, wherein each indexed binary tree is configured to receive an input and generate one of a first output or a second output, wherein the plurality of indexed binary trees are arranged in one or more decision trees configured to generate a final output value, wherein training the plurality of indexed binary trees comprises determining a comparison value for each indexed binary tree, wherein at least one indexed binary tree includes a missing value node identifier identifying a next node of a corresponding decision tree when a feature value to be compared to the comparison value is missing, and wherein each indexed binary tree in the plurality of indexed binary trees is generated by converting a trained booster of an XGBoost model into the indexed binary tree;
optimizing the trained machine learning model with a training loss term and a regularization term;
implementing a feature extractor configured to extract a feature set, wherein the feature set is defined by the input expected by the plurality of indexed binary trees;
receiving first data identifying a plurality of orders for delivery; determining a second plurality of features based on the first data, wherein the second plurality of features is extracted by the feature extractor and corresponds to the feature set;
determining final outputs for each decision tree based on providing the second plurality of features to the plurality of indexed binary trees and compare the final output with a threshold number determined by the trained machine learning model;
determining an estimated delivery time for each of the plurality of orders based on the determined final outputs for the one or more decision trees; and
transmitting a plurality of route assignments based on the determined estimated delivery time for each of the plurality of orders to a plurality of devices configured to receive at least one of the plurality of route assignments.

11. The method of claim 10, further comprising:
receiving second data identifying an origin address and a destination address for delivery of an order;
determining the second plurality of features based on the second data;
determining one of the first output and the second output for each binary tree based on providing the second plurality of features to the plurality of binary trees; and
determining a vehicle route for delivery of the order based on the determined final outputs for the one or more decision trees.

12. The method of claim 10, wherein the first plurality of features comprises an origin data, destination data previous delivery data, loading time data, and order data for each of the plurality of previous orders.

13. The method of claim 10, wherein determining the estimated delivery time for each of the plurality of orders comprises:
determining a loading time of each of the plurality of orders at a storage facility;
determining a travel time from the storage facility to a delivery address of each of the plurality of orders; and determining the estimated delivery time based on the loading time and the travel time.

14. The method of claim 13, wherein determining the estimated delivery time comprises summing the determined ones of the first output and the second output for the plurality of binary trees.

15. The method of claim 13, further comprising:
generating a scoring metric based on the estimated delivery time and an actual delivery time for each of the plurality of orders; and
determining whether a performance requirement is satisfied based on the generated scoring metric.

16. The method of claim 10, wherein the iterative training process determines the error between forecast delivery window times and actual delivery times, and wherein at least one booster of the XGBoost model is modified based on the error.

17. A non-transitory computer readable medium having instructions stored thereon, wherein the instructions, when executed by at least one processor, cause a device to perform operations comprising:
obtaining historical order data identifying a plurality of previous orders;
training a machine learning model using an iterative training process, wherein the iterative training process calculates an error between an estimated and an actual output, the error calculated including at least a mean absolute percentage error (MAPE) algorithm, a weighted MAPE algorithm, or a symmetric MAPE algorithm, configured to determine a first plurality of features in the historical order data, wherein the machine learning model includes a plurality of indexed binary trees with the determined first plurality of features, wherein each indexed binary tree is configured to receive an input and generate one of a first output or a second output, wherein the plurality of indexed binary trees are arranged in one or more decision trees configured to generate a final output value, wherein training the plurality of indexed binary trees comprises determining a comparison value for each indexed binary tree, wherein at least one indexed binary tree includes a missing value node identifier identifying a next node of a corresponding decision tree when a feature value to be compared to the comparison value is missing, and wherein each indexed binary tree in the plurality of indexed binary trees is generated by converting a trained booster of an XGBoost model into the indexed binary tree;
optimizing the trained machine learning model with a training loss term and a regularization term;
implementing a feature extractor configured to extract a feature set, wherein the feature set is defined by the input expected by the plurality of indexed binary trees;
receiving first data identifying a plurality of orders for delivery;
determining a second plurality of features based on the first data, wherein the second plurality of features is extracted by the feature extractor and corresponds to the feature set;
determining final outputs for each decision tree based on providing the second plurality of features to the plurality of indexed binary trees and compare the final output with a threshold number determined by the trained machine learning model;
determining an estimated delivery time for each of the plurality of orders based on the determined final outputs for the one or more decision trees; and
transmitting a plurality of route assignments based on the determined estimated delivery time for each of the plurality of orders to a plurality of devices configured to receive at least one of the plurality of route assignments.

18. The non-transitory computer readable medium of claim 17, wherein the first plurality of features comprises an origin data, destination data previous delivery data, loading time data, and order data for each of the plurality of previous orders.

19. The non-transitory computer readable medium of claim 17, wherein determining the estimated delivery time for each of the plurality of orders comprises:
determining a loading time of each of the plurality of orders at a storage facility;
determining a travel time from the storage facility to a delivery address of each of the plurality of orders; and
determining the estimated delivery time based on the loading time and the travel time.

20. The non-transitory computer readable medium of claim 17, wherein the iterative training process determines the error between forecast delivery window times and actual delivery times, and wherein at least one booster of the XGBoost model is modified based on the error.

* * * * *